(12) United States Patent
Hitoshio et al.

(10) Patent No.: US 9,175,360 B2
(45) Date of Patent: Nov. 3, 2015

(54) METHOD FOR MANUFACTURING SEAMLESS STEEL PIPE FOR LINE PIPE AND SEAMLESS STEEL PIPE FOR LINE PIPE

(75) Inventors: Keisuke Hitoshio, Hannan (JP); Kunio Kondo, Sanda (JP); Yuji Arai, Amagasaki (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 212 days.

(21) Appl. No.: 13/540,016

(22) Filed: Jul. 2, 2012

(65) Prior Publication Data
US 2012/0267014 A1  Oct. 25, 2012

Related U.S. Application Data

(63) Continuation of application No. PCT/JP2011/050174, filed on Jan. 7, 2011.

(30) Foreign Application Priority Data

Jan. 27, 2010 (JP) .................................. 2010-016004

(51) Int. Cl.
  *C21D 9/08* (2006.01)
  *C22C 38/00* (2006.01)
  (Continued)

(52) U.S. Cl.
  CPC *C21D 8/105* (2013.01); *C21D 1/18* (2013.01); *C21D 9/08* (2013.01); *C21D 9/085* (2013.01); *C22C 38/02* (2013.01); *C22C 38/04* (2013.01); *C22C 38/06* (2013.01); *C22C 38/22* (2013.01); *C22C 38/26* (2013.01); *C22C 38/28* (2013.01); *C22C 38/42* (2013.01); *C22C 38/44* (2013.01);
  (Continued)

(58) Field of Classification Search
  CPC ............ C21D 1/18; C21D 8/105; C21D 9/08; C21D 9/085; C22C 38/02; C22C 38/04; C22C 38/06; C22C 38/22; C22C 38/26; C22C 38/28; C22C 38/42; C22C 38/44; C22C 38/46; C22C 38/50; F16L 9/02
  USPC .......................... 148/320, 332, 336, 337, 593
  See application file for complete search history.

(56) References Cited

U.S. PATENT DOCUMENTS

| 5,938,865 | A | 8/1999 | Kondo et al. |
| 6,024,808 | A | 2/2000 | Kondo et al. |
| 2008/0216928 | A1* | 9/2008 | Kobayashi et al. ........... 148/593 |

FOREIGN PATENT DOCUMENTS

| JP | 59-232221 | 12/1984 |
| JP | 60-009825 | 1/1985 |

(Continued)

*Primary Examiner* — Roy King
*Assistant Examiner* — Caitlin Kiechle
(74) *Attorney, Agent, or Firm* — Clark & Brody (57) ABSTRACT

There is provided a method for manufacturing a seamless steel pipe for line pipe, capable of improving the toughness of the seamless steel pipe for line pipe. A round billet having a chemical composition, by mass percent, of C: 0.02 to 0.15%, Si: at most 0.5%, and Mn: 0.5 to 2.5%, the balance being Fe and impurities, is heated. The heated round billet is piercing-rolled to produce a hollow shell. The hollow shell is elongated and rolled and sized to produce a seamless steel pipe. The seamless steel pipe is water cooled, and the water cooling is stopped when the temperature of the seamless steel pipe reaches at most 450° C. The water-cooled seamless steel pipe is quenched, and the quenched seamless steel pipe is tempered.

4 Claims, 7 Drawing Sheets (51) Int. Cl.

| | | |
|---|---|---|
| *C22C 38/08* | (2006.01) | |
| *C21D 8/10* | (2006.01) | |
| *C22C 38/02* | (2006.01) | |
| *C22C 38/04* | (2006.01) | |
| *C22C 38/06* | (2006.01) | |
| *C22C 38/22* | (2006.01) | |
| *C22C 38/26* | (2006.01) | |
| *C22C 38/28* | (2006.01) | |
| *C22C 38/42* | (2006.01) | |
| *C22C 38/44* | (2006.01) | |
| *C22C 38/46* | (2006.01) | |
| *C22C 38/50* | (2006.01) | |
| *C21D 1/18* | (2006.01) | |
| *F16L 9/02* | (2006.01) | |

(52) U.S. Cl.
CPC ................. *C22C 38/46* (2013.01); *C22C 38/50* (2013.01); *F16L 9/02* (2013.01)

(56) References Cited

FOREIGN PATENT DOCUMENTS

| | | |
|---|---|---|
| JP | 63-215309 | 9/1988 |
| JP | 09-003539 | 1/1997 |
| JP | 2000-104117 | 4/2000 |
| JP | 3755163 | 3/2006 |
| JP | 3855300 | 12/2006 |
| JP | 2008-266700 | 11/2008 |
| WO | 2007/023804 | 3/2007 |

\* cited by examiner

METHOD FOR MANUFACTURING SEAMLESS STEEL PIPE FOR LINE PIPE AND SEAMLESS STEEL PIPE FOR LINE PIPE

TECHNICAL FIELD

The present invention relates to a method for manufacturing a seamless steel pipe and a seamless steel pipe and, more particularly, to a method for manufacturing a seamless steel pipe for line pipe and a seamless steel pipe for line pipe.

BACKGROUND ART

A pipeline laid on the bottom of the sea allows a high-pressure fluid to flow therein. The pipeline is further subjected to repeated distortion caused by waves and to a seawater pressure. Therefore, a steel pipe used for the pipeline on the bottom of the sea is required to have high strength and high toughness.

If the wall thickness of a seamless steel pipe for line pipe is increased, the high strength can be achieved. However, the increase in wall thickness is liable to cause brittle fracture and decreases the toughness. Therefore, a seamless steel pipe for line pipe used on the bottom of the sea is especially required to have excellent toughness.

A method for manufacturing a seamless steel pipe for line pipe while improving the toughness has been disclosed in JP2000-104117A (Patent Document 1). In the manufacturing method disclosed in Patent Document 1, the steel pipe temperature immediately after piercing-rolling is at least 950° C., and the steel pipe is soaked at a temperature of 900 to 1000° C. with the steel pipe temperature maintained above the Ar3 point. Then, the soaked steel pipe is cooled at a cooling rate of at least 5° C./sec.

Also, methods for manufacturing a steel pipe other than the seamless steel pipe for line pipe while improving the toughness have been disclosed in JP63-215309A (Patent Document 2), JP9-3539A (Patent Document 3), JP2008-266700A (Patent Document 4), JP3755163B (Patent Document 5), and JP3855300B (Patent Document 6).

In the manufacturing method disclosed in Patent Document 2, a piercer, a mandrel mill, a cooling apparatus, a reheating furnace, and a stretch reducer are used. A billet is pierced by the piercer to produce a hollow shell, and the hollow shell is elongated and rolled by the mandrel mill. Then, the elongated and rolled hollow shell is cooled to a temperature of at most the Ar1 point by the cooling apparatus, and the cooled material pipe is sized by the stretch reducer.

In the manufacturing method disclosed in Patent Document 3, a finish-rolled steel pipe is cooled from a temperature of at least the Ar3 point at a cooling rate higher than that of air cooling. The cooled steel pipe is tempered at a temperature of at most the Ac1 point.

In the manufacturing method disclosed in Patent Document 4, a sized steel pipe is acceleratedly cooled. The acceleratedly cooled steel pipe is held at a temperature of 350 to 600° C.

In the manufacturing method disclosed in Patent Document 5, a finish-rolled steel pipe is heated to a temperature of 850 to 1100° C., and the heated steel pipe is quenched. The cooling rate for quenching is not subject to any limitation.

In the manufacturing method disclosed in Patent Document 6, a finish-rolled steel pipe is cooled to a temperature of at most the Ar3 point at a cooling rate of at least 80° C./sec, and the cooled steel pipe is quenched and tempered.

SUMMARY OF INVENTION

Technical Problem

With the manufacturing method disclosed in Patent Document 1, the toughness of the seamless steel pipe for line pipe is improved to some degree. In recent years, however, the seamless steel pipe for line pipe has been required to have a further improved toughness. In the manufacturing methods disclosed in Patent Documents 2 to 6, the manufactured steel pipes are of steel types different from the seamless steel pipe for line pipe. Therefore, these manufacturing methods are not necessarily suitable for improving the toughness of the seamless steel pipe for line pipe.

DISCLOSURE OF THE INVENTION

An objective of the present invention is to provide a method for manufacturing a seamless steel pipe for line pipe, capable of improving the toughness of the seamless steel pipe for line pipe.

The present inventors studied a method for further refining the crystal grains of steel to improve the toughness of the seamless steel pipe for line pipe. As a result, the present inventors came up with an idea that the crystal grains of a steel pipe may be refined by acceleratedly cooling the steel pipe produced by hot working and then by quenching the steel pipe. Specifically, a step of quenching is added between a step of water cooling (accelerated cooling) of the seamless steel pipe produced by a piercing machine and a continuous mill (a mandrel mill and a sizer or a stretch reducer) and a step of tempering. The crystal grains are refined in the seamless steel pipe for line pipe manufactured by this manufacturing method, so that the toughness is improved.

The present inventors further came up with an idea that if a water cooling stop temperature is decreased in the accelerated cooling, the crystal grains may further be refined. The water cooling stop temperature refers to the surface temperature of steel pipe at the time when water cooling is stopped in the accelerated cooling. If the water cooling stop temperature is low when the steel pipe for line pipe having a surface temperature of at least the Ar3 point is water cooled, a bainitic structure is produced in the steel. The bainitic structure is considered to be produced by lattice transformation like martensitic structure, and includes a highly dense lattice defect such as dislocation. If the steel pipe having a bainitic structure is heated to the quenching temperature, fine γ grains are produced with the highly dense lattice defect being an initiation site. Therefore, the crystal grains of the quenched and tempered steel pipe are refined, so that the toughness of steel pipe is improved.

Figure 1:
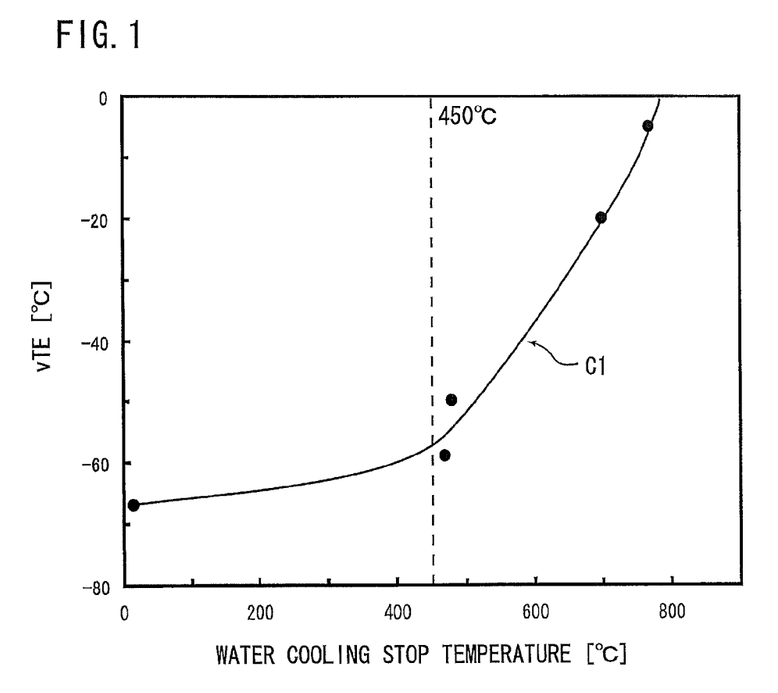
FIG. 1 is a diagram showing the relationship between energy transition temperature and water cooling stop temperature of a seamless steel pipe for line pipe in accordance with the present invention.

Based on the above-described theory, the present inventors examined the relationship between the water cooling stop temperature in accelerated cooling and the toughness. The relationship between water cooling stop temperature and toughness is shown in FIG. 1. FIG. 1 was obtained by the method described below. A plurality of billets each having the chemical composition given in Table 1 were prepared.

TABLE 1

| Chemical composition (mass %, balance being Fe and impurities other than P, S and Al) | | | | | | | | | | | | |
|---|---|---|---|---|---|---|---|---|---|---|---|---|
| C | Si | Mn | P | S | Cu | Cr | Ni | Mo | Ti | V | Nb | Al |
| 0.06 | 0.3 | 1.3 | 0.01 | 0.001 | — | 0.2 | — | 0.1 | 0.03 | — | 0.03 | 0.05 |

The billets were heated by a heating furnace. Successively, the billets were piercing-rolled into hollow shells by a piercing machine. Then, the hollow shells were elongated and rolled by an elongation rolling mill, and the hollow shells were sized by a sizing mill, whereby a plurality of seamless steel pipes for line pipe were produced. Successively, the produced seamless steel pipes were water cooled (acceleratedly cooled). At this time, the water cooling stop temperature was changed for every seamless steel pipe. The surface temperatures of all of the seamless steel pipes at the time when water cooling was started were 1100° C. After cooling, the seamless steel pipes were quenched at a quenching temperature of 950° C., and soaked for 40 minutes. After quenching, the seamless steel pipes were tempered at a tempering temperature of 650° C., and soaked for 30 minutes. By the above-described process, seamless steel pipes for line pipe were manufactured.

From a central portion of the wall thickness of each of the manufactured seamless steel pipes for line pipe, V-notch specimen conforming to JIS Z 2202 was sampled. By using this V-notch specimen, the Charpy impact test conforming to JIS Z 2242 was conducted to determine an energy transition temperature vTE. Thereby, a curve C1 shown in FIG. 1 was obtained.

Referring to FIG. 1, as the water cooling stop temperature decreased, the energy transition temperature vTE (° C.) decreased. Further, the slope of the curve C1 changed at the water cooling stop temperature of 450° C. More specifically, when the water cooling stop temperature decreased, the energy transition temperature decreased rapidly until the water cooling stop temperature reached 450° C., and on the other hand, in the temperature range defined below 450° C., even if the water cooling stop temperature decreased, the energy transition temperature did not decrease so much. That is, the curve C1 had an inflection point at the water cooling stop temperature of 450° C.

Based on the above-described findings, the present inventors completed the inventions described below.

The method for manufacturing a seamless steel pipe for line pipe in accordance with the present invention includes the steps of heating a round billet having a chemical composition including, by mass percent, C: 0.02 to 0.15%, Si: at most 0.5%, and Mn: 0.5 to 2.5%, the balance being Fe and impurities, producing a hollow shell by piercing-rolling the heated round billet, producing a seamless steel pipe by elongation rolling and sizing the hollow shell, water cooling the produced seamless steel pipe and stopping water cooling when the temperature of the seamless steel pipe reaches at most 450° C., quenching the water-cooled seamless steel pipe, and tempering the quenched seamless steel pipe.

Preferably, the method for manufacturing a seamless steel pipe for line pipe further includes a step of heating the produced seamless steel pipe to 900 to 1100° C. In the water cooling step, the heated seamless steel pipe is water cooled.

Preferably, the chemical composition of the round billet further includes one or more types selected from a group of Cu: at most 1.5%, Ni: at most 1.5%, Cr: at most 1.0%, Mo: at most 0.8%, V: at most 0.2%, Nb: at most 0.06%, and Ti: at most 0.05%.

The seamless steel pipe for line pipe in accordance with the present invention is manufactured by the above-described manufacturing method.

BEST MODE FOR CARRYING OUT THE INVENTION

An embodiment of the present invention will now be described in detail with reference to the drawings. In the drawings, the same symbols are applied to the same or equivalent portions, and the explanation thereof is not repeated.

Chemical Composition

A seamless steel pipe for line pipe in accordance with the embodiment of the present invention has a chemical composition described below. Hereunder, an ideogram of % relating to an alloying element refers to a mass percent.

C: 0.02 to 0.15%

Carbon (C) increases the strength of steel. To provide a strength necessary for a line pipe, the lower limit value of C content is 0.02%. On the other hand, if carbon is contained excessively, the toughness of the weld heat affected zone of the welded portion and the base metal of the line pipe decreases. Therefore, the upper limit value of C content is 0.15%. The C content is preferably 0.04 to 0.12%, further preferably 0.04 to 0.09%.

Si: at most 0.5%

Silicon (Si) deoxidizes steel. However, if silicon is contained excessively, the toughness of steel decreases. Therefore, the Si content is at most 0.5%. The Si content is preferably 0.05 to 0.35%.

Mn: 0.5 to 2.5%

Manganese (Mn) enhances the hardenability of steel, and increases the strength of steel. To provide a strength necessary for a line pipe, the lower limit value of Mn content is 0.5%. On the other hand, if manganese is contained excessively, manganese segregates, which results in a decrease in the toughness of the weld heat affected zone and the base metal. Therefore, the upper limit value of Mn content is 2.5%. The Mn content is preferably 0.5 to 2.2%.

The balance is iron (Fe) and impurities. The impurities include phosphorus (P), sulfur (S), oxygen (O), nitrogen (N), and aluminum (Al). Phosphorus causes center segregation. Sulfur forms MnS with Mn, and decreases the toughness of steel. Oxygen reduces the cleanliness of steel. Nitrogen forms a solid solution in the steel, which results in a decrease in the toughness of steel. Aluminum deoxidizes steel; however, aluminum reduces the cleanliness of steel, and decreases the toughness thereof. Therefore, in the present invention, aluminum is an impurity.

The P content is preferably at most 0.015%. The S content is preferably at most 0.004%. The 0 content is preferably at most 0.01%. The N content is preferably at most 0.007%. The Al content is preferably at most 0.05%.

As the chemical composition of the seamless steel pipe for line pipe in accordance with this embodiment, the optional element(s) described below may be contained further.

All of copper (Cu), nickel (Ni), chromium (Cr), and molybdenum (Mo) enhance the hardenability of steel, and increase the strength of steel. Hereunder, these elements are described in detail.

Cu: at most 1.5%

Copper (Cu) is an optional element. Copper enhances the hardenability of steel, and increases the strength of steel. If even a slight amount of copper is contained, the above-described effects can be achieved. The Cu content is preferably at least 0.05%. On the other hand, if copper is contained excessively, the weldability of steel decreases. Further, copper reduces the grain boundary strength at high temperatures, which makes the steel liable to be cracked at the time of hot rolling. Therefore, the Cu content is at most 1.5%.

Ni: at most 1.5%

Nickel (Ni) is an optional element. Nickel enhances the hardenability of steel, and increases the strength of steel. If even a slight amount of nickel is contained, the above-described effects can be achieved. The Ni content is preferably at least 0.05%. On the other hand, if nickel is contained excessively, the above-described effects saturate. Therefore, the Ni content is at most 1.5%.

Cr: at most 1.0%

Chromium (Cr) is an optional element. Chromium enhances the hardenability of steel, and increases the strength of steel. Further, chromium enhances the temper softening resistance of steel. If even a slight amount of chromium is contained, the above-described effects can be achieved. The Cr content is preferably at least 0.02%. On the other hand, if chromium is contained excessively, the weldability of steel decreases, and also the toughness of steel decreases. Therefore, the Cr content is at most 1.0%.

Mo: at most 0.8%

Molybdenum (Mo) is an optional element. Molybdenum enhances the hardenability of steel, and increases the strength of steel. If even a slight amount of molybdenum is contained, the above-described effects can be achieved. The Mo content is preferably at least 0.02%. On the other hand, if molybdenum is contained excessively, the toughness of steel decreases, and also the weldability of steel decreases. Therefore, the Mo content is at most 0.8%.

All of vanadium (V), niobium (Nb), and titanium (Ti) precipitate carbo-nitrides to increase the strength and toughness of steel. Hereunder, these elements are described in detail.

V: at most 0.2%

Nb: at most 0.06%

Both of vanadium (V) and niobium (Nb) are optional elements. Both of vanadium and niobium produce carbo-nitrides, and contribute to refining of crystal grains of steel. Therefore, vanadium and niobium increase the strength and toughness of steel. If even a slight amount of vanadium and/or niobium are contained, the above-described effects can be achieved. The V content is preferably at least 0.01%, and the Nb content is preferably at least 0.01%. On the other hand, if vanadium and niobium are contained excessively, the toughness of the welded portion of steel decreases. Therefore, the V content is at most 0.2%, and the Nb content is at most 0.06%. The Upper limit value of V content is preferably 0.1%, and the upper limit value of Nb content is 0.03%.

Ti: at most 0.05%

Titanium (Ti) is an optional element. Titanium produces carbo-nitrides, and contributes to refining of crystal grains of steel. Therefore, titanium increases the strength and toughness of steel. If even a slight amount of titanium is contained, the above-described effects can be achieved. The Ti content is preferably at least 0.002%. However, if titanium is contained excessively, the toughness of steel rather decreases. Therefore, the Ti content is at most 0.05%. The Upper limit value of Ti content is preferably 0.03%

Manufacturing Equipment

Figure 2:
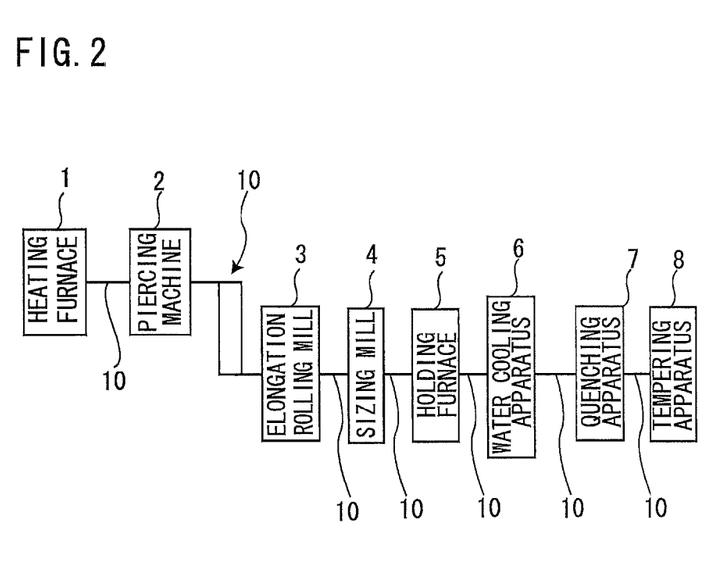
FIG. 2 is a block diagram showing a configuration of a manufacturing equipment line for a seamless steel pipe for line pipe in accordance with the present invention.

FIG. 2 is a block diagram showing one example of a manufacturing line for the seamless steel pipe for line pipe in accordance with this embodiment. Referring to FIG. 2, the manufacturing line includes a heating furnace 1, a piercing machine 2, an elongation rolling mill 3, a sizing mill 4, a holding furnace 5, a water cooling apparatus 6, a quenching apparatus 7, and a tempering apparatus 8. Between the apparatuses, a plurality of transfer rollers are arranged. In FIG. 2, the quenching apparatus 7 and the tempering apparatus 8 are included in the manufacturing line. However, the quenching apparatus 7 and the tempering apparatus 8 may be arranged separately from the manufacturing line. In other words, the quenching apparatus 7 and the tempering apparatus 8 may be arranged off-line.

Manufacturing Method

Figure 3:
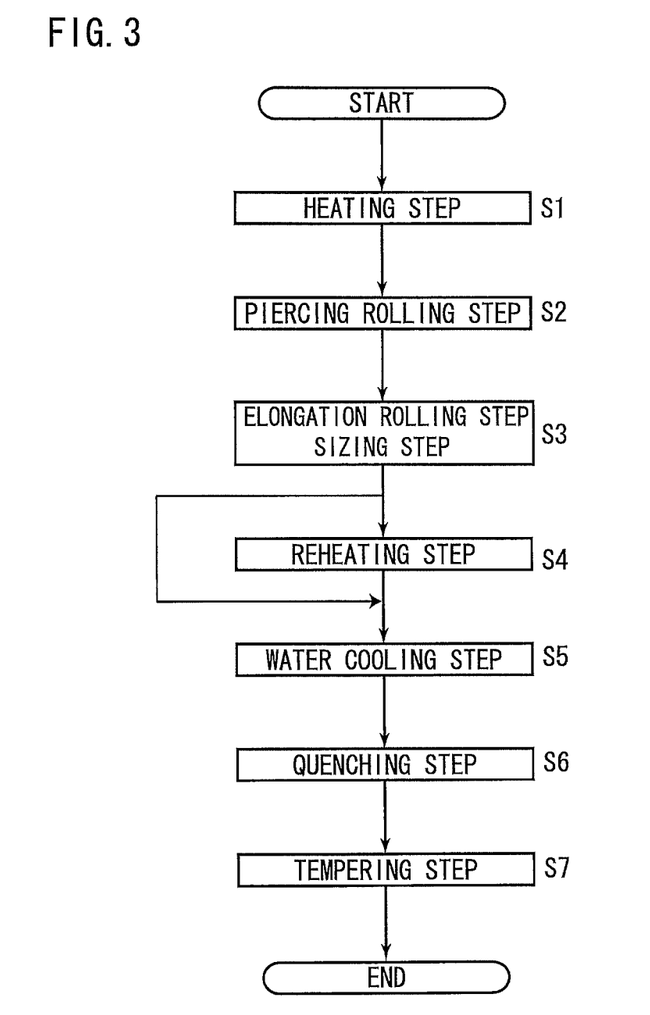
FIG. 3 is a flowchart showing a manufacture flow of a seamless steel pipe for line pipe using the manufacturing equipment line shown in FIG. 2.
Figure 4:
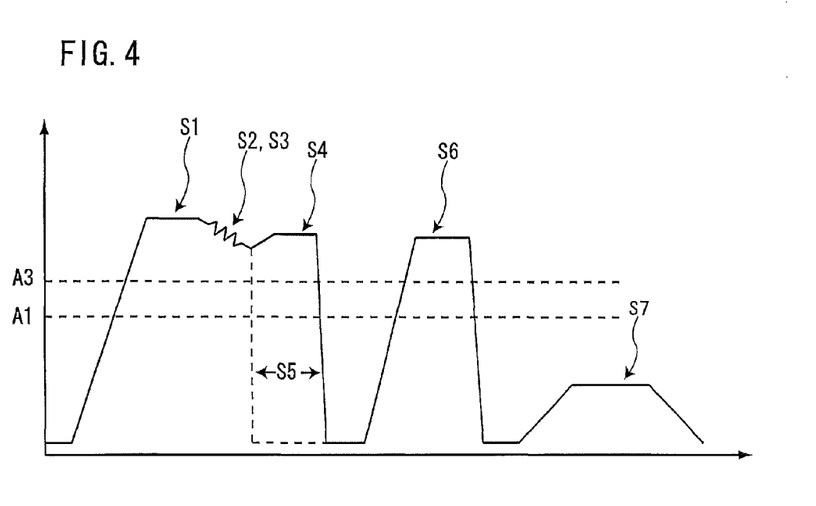
FIG. 4 is a diagram showing a change in surface temperature of a material being processed in steps in the manufacture flow shown in FIG. 3.

FIG. 3 is a flowchart showing a manufacturing process of the seamless steel pipe in accordance with this embodiment. FIG. 4 is a diagram showing a change in surface temperature of a material being rolled (a round billet, a hollow shell, and a seamless steel pipe) with respect to time during the manufacture.

Referring to FIGS. 3 and 4, in the method for manufacturing the seamless steel pipe for line pipe in accordance with this embodiment, first, a round billet is heated by the heating furnace 1 (S1). Successively, the heated round billet is hot worked into a seamless steel pipe (S2 and S3). Specifically, the round billet is piercing-rolled into a hollow shell by the piercing machine 2 (S2), and further, the hollow shell is rolled into the seamless steel pipe by the elongation rolling mill 3 and the sizing mill 4 (S3). The seamless steel pipe produced by hot working is heated to a predetermined temperature as necessary by the holding furnace 5 (S4). Successively, the seamless steel pipe is water cooled (acceleratedly cooled) by the water cooling apparatus 6 so that the surface temperature of the seamless steel pipe is at most 450° C. (S5). The water cooled seamless steel pipe is quenched by the quenching apparatus 7 (S6), and is tempered by the tempering apparatus 8 (S7). Hereunder, each of the steps is explained in detail.

Heating Step (S1)

First, a round billet is heated by the heating furnace 1. The heating temperature is preferably 1050 to 1300° C. If the round billet is heated at a temperature in this temperature range, the hot workability of the round billet at the piercing-rolling time is high, and the production of surface defects is restrained. Also, if the round billet is heated at a temperature in this temperature range, the coarsening of crystal grains is restrained. The heating furnace 1 is a well-known walking beam furnace or rotary furnace, for example.

Piercing-Rolling Step (S2)

The round billet is taken out of the heating furnace 1, and the heated round billet is piercing-rolled by the piercing machine 2. The piercing machine 2 has a well-known configuration. Specifically, the piercing machine 2 includes a pair of conical rolls and a plug arranged between the conical rolls. The piercing machine 2 is preferably a toe angle-type piercing machine. This is because piercing-rolling can be performed at a high pipe expansion rate.

Elongation Rolling Step and Sizing Step (S3)

Next, the hollow shell produced by the piercing mill is elongated and rolled by the elongation rolling mill 3. The elongation rolling mill 3 includes a plurality of roll stands arranged in series. The elongation rolling mill 3 is a mandrel mill, for example. Successively, the elongated and rolled hollow shell is sized by the sizing mill 4 to produce a seamless steel pipe. The sizing mill 4 includes a plurality of roll stands arranged in series. The sizing mill 4 is a sizer or a stretch reducer, for example.

The outer surface temperature of the hollow shell rolled by the rearmost roll stand of the plurality of roll stands of the sizing mill 4 is defined as a "finishing temperature". The finishing temperature is measured, for example, by a temperature sensor disposed on the delivery side of the rearmost roll stand of the sizing mill 4. The finishing temperature is preferably at least the A3 point (more specifically, the Ac3 point) as shown in FIG. 4, further preferably at least 900° C., and still further preferably at least 950° C. The Ac3 point of the seamless steel pipe having the chemical composition of the present invention is 750 to 950° C. At a finishing temperature of 900° C. or higher, in the hollow shell being subjected to sizing, the heat loss caused by roll heat dissipation is small. Therefore, the temperature unevenness of the produced seamless steel pipe can be reduced.

A heating furnace may be disposed between the elongation rolling mill 3 and the sizing mill 4. In this case, the elongated and rolled hollow shell is heated by the heating furnace, and the heated material pipe is sized by the sizing mill 4. Therefore, the material pipe temperature at the time of sizing increases, so that the load applied to the sizing mill 4 is reduced.

Reheating Step (S4)

A reheating step (S4) is carried out as necessary. In other words, the reheating step need not necessarily be carried out. In the case where the reheating step is not carried out, in FIG. 3, the process proceeds from step S3 to step S5. Also, in the case where the reheating step is not carried out, in FIG. 2, the holding furnace 5 is not provided.

In the case where the reheating step is carried out, the produced seamless steel pipe is charged into the holding furnace 5 and is heated. Thereby, the temperature unevenness of the produced seamless steel pipe can be reduced. The heating temperature in the holding furnace 5 is the Ar3 point to 1100° C., preferably 900 to 1100° C., and further preferably 950 to 1100° C. If the heating temperature is lower than the Ar3 point, the a phase precipitates and the micro-structure becomes nonuniform, so that the variations in strength increase. On the other hand, if the heating temperature exceeds 1100° C., the crystal grains coarsen. The heating time is preferably 1 to 30 minutes.

Water Cooling Step (S5)

The seamless steel pipe produced in step S3 or the seamless steel pipe reheated in step S4 is water cooled (acceleratedly cooled) by the water cooling apparatus 6. The surface temperature of the seamless steel pipe just before water cooling is substantially the same as the finishing temperature or the heating temperature in the holding furnace. That is, the surface temperature of the seamless steel pipe just before water cooling is at least the Ar3 point, preferably at least 900° C., and further preferably at least 950° C.

The water cooling apparatus 6 includes a plurality of rotating rollers, a laminar stream device, and a jet stream device. The plurality of rotating rollers are arranged in two rows, and the seamless steel pipe is arranged between the plurality of rotating rollers in two rows. At this time, each of the two-row rotating rollers comes into contact with a lower portion on the outer surface of the seamless steel pipe. When the rotating rollers rotate, the seamless steel pipe rotates around the axis thereof. The laminar stream device is arranged above the rotating rollers, and sprinkles water onto the seamless steel pipe from above. At this time, the water sprinkled onto the seamless steel pipe forms a laminar stream. The jet stream device is disposed near the end of the seamless steel pipe placed on the rotating rollers, and injects a jet stream from the end of the seamless steel pipe into the steel pipe. By the laminar stream device and the jet stream device, the outer and inner surfaces of seamless steel pipe are cooled at the same time.

The water cooling apparatus 6 cools the seamless steel pipe until the surface temperature of seamless steel pipe reaches a temperature of at most 450° C. In other words, the water cooling stop temperature is at most 450° C. With the water cooling stop temperature at most 450° C., the micro-structure is subjected to bainitic transformation as described above. By performing quenching in the subsequent step, the crystal grains of the seamless steel pipe are refined further. As the result, the toughness of the seamless steel pipe for line pipe is improved.

The water cooling stop temperature is preferably at least 300° C., further preferably at least 350° C., and still further preferably at least 400° C. The higher the water cooling stop temperature is in the range defined below 450° C., the shorter the required time is for heating the seamless steel pipe to the quenching temperature at the time of quenching in the subsequent step. Also, the quantity of heat required for heating the seamless steel pipe to the quenching temperature can be reduced.

The cooling rate of the water cooling apparatus 6 is preferably at least 10° C./sec. The water cooling apparatus 6 may be an apparatus other than the above-described apparatus including the rotating rollers, the laminar stream device, and the jet stream device. For example, the water cooling apparatus 6 may be a water tank. In this case, the seamless steel pipe produced in step S3 is immersed in the water tank, and is cooled. Such a cooling method is called "dip cooling". Also, the water cooling apparatus 6 may consist of the laminar stream device only. In sum, the type of the water cooling apparatus 6 is not subject to any restriction as far as the seamless steel pipe can be cooled at a cooling rate of at least 10° C./sec.

It is preferable that the water cooling apparatus 6 and the quenching apparatus 7 for the next step be arranged continuously. The reason for this is that as the quenching apparatus 7 is closer to the water cooling apparatus 6, the quantity of heat required for heating the water-cooled seamless steel pipe to the quenching temperature can be reduced.

Quenching Step (S6)

The seamless steel pipe having been water cooled by the water cooling apparatus 6 is quenched. More specifically, the seamless steel pipe is heated and soaked at a quenching temperature. After heating and soaking, the seamless steel is cooled rapidly by water. The quenching temperature is preferably higher than the Ac3 point and at most 1000° C. When the seamless steel pipe is heated to the above-described quenching temperature, the micro-structure of seamless steel pipe transforms from bainite to a fine austenitic structure. That is, reverse transformation takes place. At this time, the crystal grains are refined. That is, by performing accelerated cooling in step S5 and making the water cooling stop temperature at most 450° C., the refining of crystal grains can be promoted in the quenching step.

If the quenching temperature is lower than the Ac3 transformation point, the reverse transformation does not take place sufficiently. On the other hand, if the quenching temperature exceeds 1000° C., the crystal grains coarsen. The soaking time in quenching is preferably 10 seconds to 30 minutes.

Tempering Step (S7)

The quenched steel pipe is tempered. The tempering temperature is at most Ac1 point, and is regulated based on desired dynamic properties. The Ac1 point of the seamless steel pipe having the chemical composition of the present invention is 680 to 720° C. By tempering, the strength grade of the seamless steel pipe of the present invention can be regulated to at least X60 based on the API standard (the yield stress: at least 415 MPa, the tensile strength: at least 520 MPa). The variations in tempering temperature are preferably ±10° C., further preferably ±5° C. If the variations in tempering temperature are small, the desired dynamic properties are achieved easily.

In the above-described manufacturing method, accelerated cooling in which the water cooling stop temperature is defined to be at most 450° C. is performed (S5), and thereafter quenching is performed (S6). By these steps, the refining of crystal grains is promoted. Therefore, the manufactured seamless steel pipe for line pipe has an excellent toughness as described above.

EXAMPLE 1

Seamless steel pipes for line pipe each having the chemical composition given in Table 1 were manufactured, and the strength and toughness thereof were examined.

Examination Method

A plurality of billets each having the chemical composition given in Table 1 were produced. The produced billets were heated by the heating furnace, and then, the billets were piercing-rolled by the piercing machine to produce hollow shells. Successively, the hollow shells were elongated and rolled by the mandrel mill, and then, were sized by the sizer, whereby a plurality of seamless steel pipes for line pipe were produced. Successively, the produced steel pipes were water cooled (acceleratedly cooled). At this time, the water cooling stop temperature was changed for every steel pipe. The finishing temperatures of all the seamless steel pipes were 1100° C. The cooled seamless steel pipes were quenched at a quenching temperature of 950° C., and were soaked for 40 minutes. After quenching, the seamless steel pipes were tempered at a tempering temperature of 650° C., and were soaked for 30 minutes. By the above-described steps, seamless steel pipes for line pipe were manufactured.

Examination of Strength

From a central portion of the wall thickness of each of the manufactured seamless steel pipes, a tensile test specimen conforming to JIS Z 2201 was sampled. By using this tensile test specimen, a tensile test conforming to JIS Z 2241 was conducted in the atmosphere of normal temperature (25° C.). By the tensile test, the yield stress and tensile strength were determined. In this example, the yield stress was determined by the 0.5% total elongation method.

Examination of Toughness

From a central portion of the wall thickness of each of the manufactured seamless steel pipes for line pipe, a V-notch specimen conforming to JIS Z 2202 was sampled. By using this V-notch specimen, the Charpy impact test conforming to JIS Z 2242 was conducted to determine an energy transition temperature vTE (° C.).

Examination Results

Figure 5:
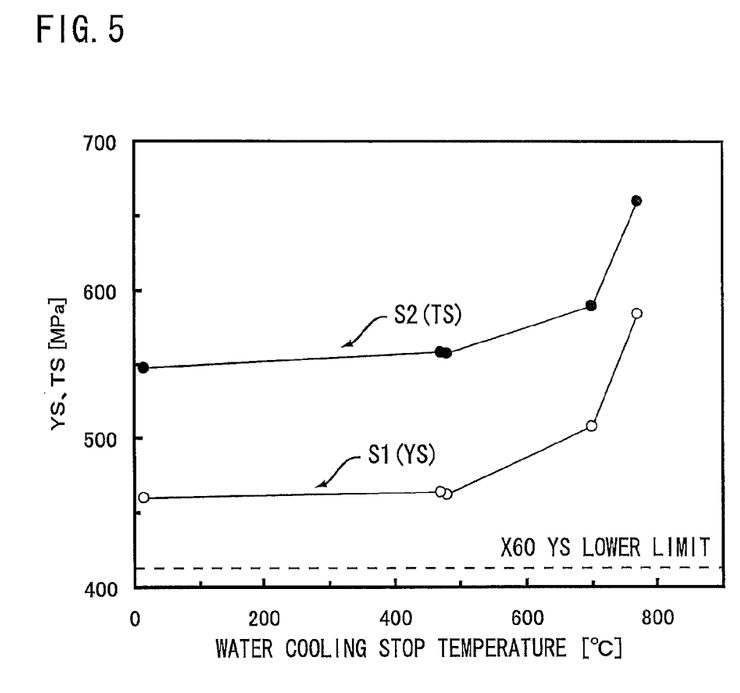
FIG. 5 is a diagram showing the relationship between strength and water cooling stop temperature of a seamless steel pipe for line pipe of example 1.

The relationship between the obtained yield stress and tensile strength and the water cooling stop temperature is shown in FIG. 5. In FIG. 5, symbol S1 denotes yield stress, and symbol S2 denotes tensile strength. Also, the relationship between the obtained energy transition temperature and the water cooling stop temperature is shown in FIG. 1. Referring to FIG. 1, the slope of the curve C1 changed at the water cooling stop temperature of 450° C. More specifically, when the water cooling stop temperature decreased, the energy transition temperature decreased rapidly until the water cooling stop temperature reached 450° C., and on the other hand, in the temperature range defined below 450° C., even if the water cooling stop temperature decreased, the energy transition temperature did not decrease so much. In the case where the water cooling stop temperature was at most 450° C., the energy transition temperature was at most −55° C., showing a satisfactory toughness.

On the other hand, referring to FIG. 5, in the case where the water cooling stop temperature was at most 450° C., the yield stress was at least 450 MPa, and the tensile strength was at least 540 MPa. Therefore, the strength grade of the sample in the case where the water cooling stop temperature was at most 450° C. was at least X60 of the API standard (the yield stress: at least 415 MPa, the tensile strength: at least 520 MPa).

EXAMPLE 2

A plurality of billets each having the chemical composition given in Table 2 were manufactured.

TABLE 2

| Chemical composition (mass %, balance being Fe and impurities other than P, S and Al) | | | | | | | | | | | | |
|---|---|---|---|---|---|---|---|---|---|---|---|---|
| C | Si | Mn | P | S | Cu | Cr | Ni | Mo | Ti | V | Nb | Al |
| 0.06 | 0.1 | 1.5 | 0.01 | 0.001 | 0.2 | 0.3 | 0.3 | 0.3 | 0.003 | 0.05 | — | 0.04 |

Examination Method

By the same manufacturing method as that in example 1, steel pipes for line pipe were manufactured by using the billets, and by the same testing method as that in example 1, the relationship between the strength (yield stress and tensile strength) and the water cooling stop temperature and the relationship between the energy transition temperature vTE (° C.) and the water cooling stop temperature were determined. In example 2, the finishing temperature of seamless steel pipe was 1050° C. In quenching, the quenching temperature was 920° C., and the soaking time was 20 minutes. In tempering, the tempering temperature was 650° C., and the soaking time was 30 minutes. Other conditions were the same as those in example 1.

Examination Results

Figure 6:
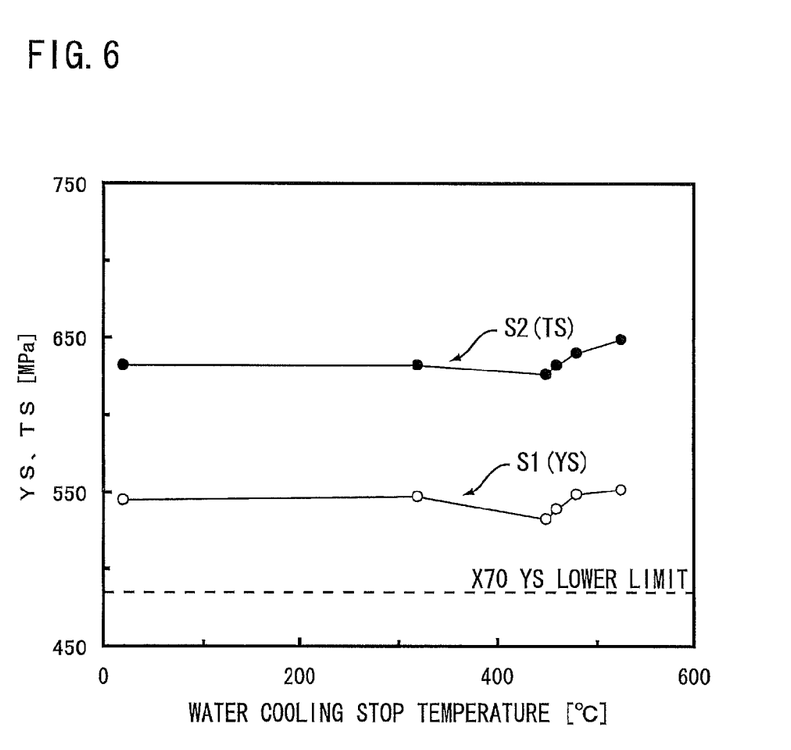
FIG. 6 is a diagram showing the relationship between strength and water cooling stop temperature of a seamless steel pipe for line pipe of example 2.

The relationship between the obtained yield stress and tensile strength and the water cooling stop temperature is shown in FIG. 6. In FIG. 6, symbol S1 denotes yield stress, and symbol S2 denotes tensile strength. Also, the relationship between the obtained energy transition temperature and the water cooling stop temperature is shown in FIG. 7.

Figure 7:
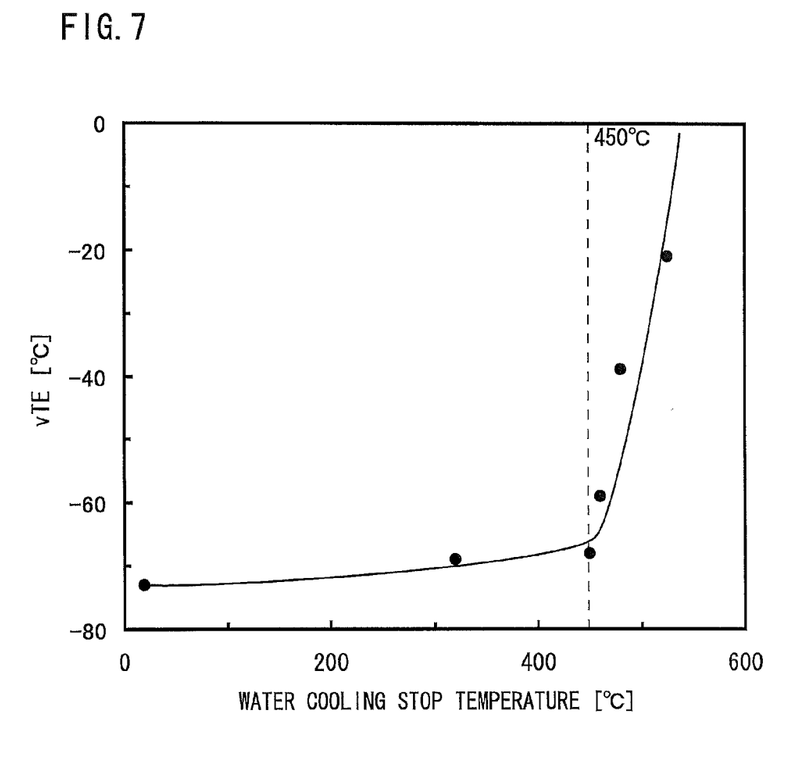
FIG. 7 is a diagram showing the relationship between energy transition temperature and water cooling stop temperature of a seamless steel pipe for line pipe of example 2.

Referring to FIG. 7, as shown in FIG. 1, until the water cooling stop temperature reached 450° C., the energy transition temperature decreased rapidly with the decrease in cooling water stop temperature, and in the temperature range defined below 450° C., even if the water cooling stop temperature decreased, the energy transition temperature did not decrease so much. In the case where the water cooling stop temperature was at most 450° C., the energy transition temperature was at most −60° C., showing a satisfactory toughness.

Referring to FIG. 6, in the case where the water cooling stop temperature was at most 450° C., the yield stress was at least 530 MPa, and the tensile strength was at least 620 MPa. Therefore, the strength grade of the sample in the case where the water cooling stop temperature was at most 450° C. was at least X70 of the API standard (the yield stress: at least 485 MPa, the tensile strength: at least 570 MPa).

The above is a description of embodiments of the present invention, and the above-described embodiments are merely examples for carrying out the present invention. Therefore, the present invention is not limited to the above-described embodiments, and the above-described embodiments can be modified as appropriate without departing from the spirit of the invention.

The invention claimed is:

1. A method for manufacturing a seamless steel pipe for line pipe, comprising the steps of:
   heating a round billet having a chemical composition comprising, by mass percent, C: 0.02 to 0.15%, Si: at most 0.5%, Mn: 0.5 to 2.5%, and Cu: 0.05 to 1.5% the balance being Fe and impurities;
   producing a hollow shell by piercing-rolling the heated round billet;
   producing a seamless steel pipe by elongation rolling and sizing the hollow shell;
   water cooling the seamless steel pipe at a cooling rate of at least 10° C./sec and stopping water cooling when the temperature of the seamless steel pipe reaches lower than 400° C. to cause bainitic transformation;
   heating and soaking the water-cooled seamless steel pipe to cause reverse transformation from a bainite to an austenitic structure;
   water cooling the heated and soaked seamless steel pipe; and
   tempering the heated, soaked, and water-cooled seamless steel pipe.

2. The method for manufacturing a seamless steel pipe for line pipe according to claim 1, wherein
   the method further comprises a step of heating the produced seamless steel pipe to 900 to 1100° C.; and
   in the water cooling step of the heated seamless steel pipe, the heated seamless steel pipe is water cooled.

3. The method for manufacturing a seamless steel pipe for line pipe according to claim 1, wherein
   the chemical composition further comprises one or more types selected from a group of Ni: at most 1.5%, Cr: at most 1.0%, Mo: at most 0.8%, V: at most 0.2%, Nb: at most 0.06%, and Ti: at most 0.05%.

4. The method for manufacturing a seamless steel pipe for line pipe according to claim 2, wherein
   the chemical composition further comprises one or more types selected from a group of Ni: at most 1.5%, Cr: at most 1.0%, Mo: at most 0.8%, V: at most 0.2%, Nb: at most 0.06%, and Ti: at most 0.05%.

* * * * *